Figure 1:
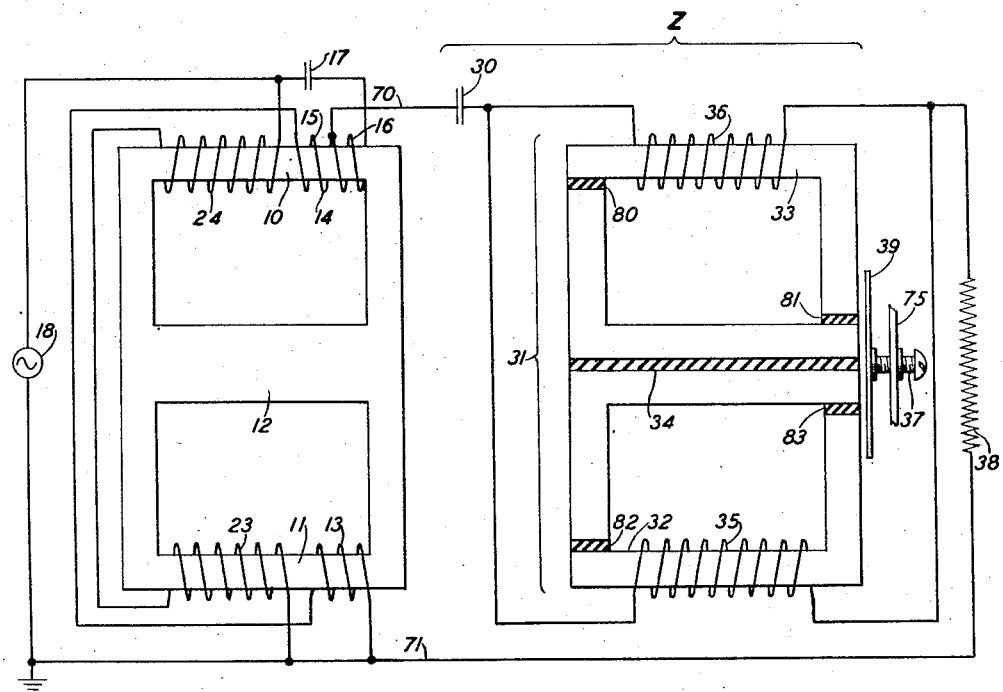

Nov. 2, 1943.  B. E. STEVENS  2,333,211
VOLTAGE REGULATOR
Filed July 1, 1942

INVENTOR
B. E. STEVENS
BY
ATTORNEY

Patented Nov. 2, 1943

2,333,211

UNITED STATES PATENT OFFICE 2,333,211

VOLTAGE REGULATOR

Bruce E. Stevens, Demarest, N. J., assignor to Bell Telephone Laboratories, Incorporated, New York, N. Y., a corporation of New York Application July 1, 1942, Serial No. 449,271

7 Claims. (Cl. 171—119)

This invention relates to voltage regulators and particularly to voltage regulators of the static type.

An object of the invention is to supply current from a commercial source of alternating current, the voltage and frequency of which may vary, to a load while maintaining constant the voltage across the load.

In accordance with a specific embodiment of the invention herein shown and described for the purpose of illustration, there is provided a transformer comprising a three-legged core structure made up of laminations of magnetic material and having windings on each of the outer legs. The main flux-producing windings, one on each of the outer legs, are connected in series with each other and with a condenser to the alternating current source to form a series ferroresonant circuit which is operated above the jumping point of the characteristic curve, these windings producing substantially equal, aiding magnetomotive forces. There are also provided two auxiliary windings, one on each outer leg, connected to the source of alternating current, these windings producing substantially equal opposing magnetomotive forces. The magnetic circuit formed by the outer legs of the core becomes saturated during operation, that is, the magnetic circuit is operated above the knee of the magnetization curve so that the permeability of the magnetic circuit decreases when the flux in the circuit increases, and vice versa. The output circuit is connected to the main windings in a manner to include at least a portion of each of the main windings in the output circuit. The windings or winding portions in the output circuit are so related that the voltage across the winding on one leg of the core rises and the voltage across the winding on the other leg decreases in response to a voltage increase of the alternating current source, the voltage across the output of the transformer being substantially constant irrespective of the voltage variations of the source. Connected in the output circuit of the transformer in series with the load are a condenser and an inductance in series, the core of the inductance being operated on a portion of the permeability curve at which the permeability decreases in response to an increase of flux through the core of the inductance, and vice versa. The impedance of this condenser and inductance in series has a minimum value at a frequency below the range of frequencies which the supply source may have during operation. The voltage at the output of the transformer increases in response to an increase of frequency of the voltage source, and vice versa. The voltage across the load, however, is maintained substantially constant irrespective of frequency changes of the source because the impedance measured across the condenser and inductance in series in the output circuit increases in response to an increase in frequency of the source, and vice versa. When the load current is increased and vice versa the voltage across the load is maintained substantially constant irrespective of load changes due to the fact that the reactance of the inductance in series in the load circuit decreases when the load increases, and vice versa. Since the combination of the inductance and condenser in the load circuit is nearly tuned to the frequency of the voltage source, harmonics of the fundamental frequency of the source are greatly attenuated or suppressed and the load current therefore has a substantially sine wave form.

Figure 2:
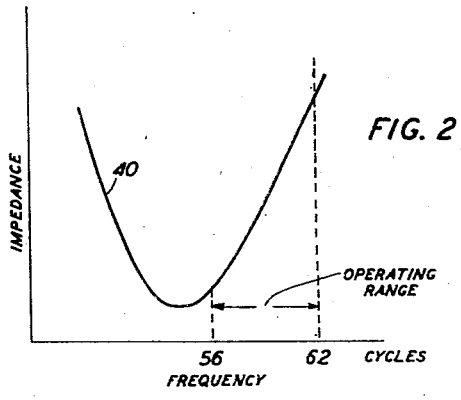

The invention will now be described with reference to the accompanying drawing in which:

Fig. 1 is a diagrammatic view of a voltage regulator in accordance with the present invention; and Fig. 2 is a curve to which reference will be made in describing the invention.

Referring to Fig. 1, there is provided a transformer comprising a three-legged core of magnetic material having outer legs 10 and 11 and a middle leg 12. The main flux which is sufficient to saturate the magnetic circuit formed by legs 10 and 11 of the core is produced by winding 14 on leg 10 and winding 13 on leg 11, these windings setting up substantially equal, aiding magnetomotive forces. These windings are a part of a series ferro-resonant circuit formed by a condenser 17 and windings 13 and 14 in series connected to a commercial source of alternating current 18 having a frequency of about 60 cycles.

An auxiliary winding 23 on leg 11 and an auxiliary winding 24 on leg 10 are also connected in series to the alternating current source 18, these windings producing substantially equal opposing magnetomotive forces so that windings 24 and 14 on leg 10 produce aiding magnetomotive forces and windings 23 and 13 on leg 11 produce opposing magnetomotive forces.

Output leads 70 and 71 are connected to the main flux-producing windings of the transformer so as to include across the output circuit 70, 71 the entire winding 13 and a portion 15 of winding 14. The load 38 to be energized is connected in the output circuit 70, 71 in series with an impedance Z comprising a condenser 30 and an inductance 31. The inductance 31 comprises a core structure like the core 10, 11, 12 except that the structure is divided into two similar portions separated by an insulating separator 34 and provided with gaps of insulating material 80, 81, 82 and 83 in the magnetic paths including the two outer legs of the core structure. If desired, there may be employed a core structure like that of inductance 31 but having a central leg of solid magnetic material and having a single winding on the central leg, the windings on the outer legs being omitted. There is a winding 35 on one of the outer legs 32 and a winding 36 on the other outer leg 36, these windings being connected in parallel with respect to each other and in series with the load 38 and condenser 30. The reluctance of the magnetic circuit including the outer legs is made variable due to the movement of the disc 39 of magnetic material with respect to the magnetic structure comprising legs 32 and 33. The disc 39 may be moved by turning the screw 37 to which the disc is secured, the screw being threaded into the mounting support 75.

In a specific embodiment of the invention which has been found to give satisfactory results, windings 13 and 14 each have 290 turns of 18-gauge wire, windings 23 and 24 each have 1450 turns of 25-gauge wire and windings 35 and 36 each have 1210 turns of 21-gauge wire, the capacity of condenser 17 is 32 microfarads and the capacity of condenser 30 is 21 microfarads. The core 10, 11, 12 and the core 32, 33 are made of laminated silicon-steel. The outer legs of each core structure have a cross-sectional area of about ⅝ square inch and the central leg 12 has about twice this area. The length of the magnetic path comprising one outer leg and the central leg is about 9 inches. The gap separators 80, 81, 82 and 83 have a thickness of about .04 inch. When the voltage of the supply source was varied from 85 to 125 volts and its frequency varied over the range from 56 to 62 cycles, the voltage across a non-inductive load of 1.2 to 1.5 amperes was maintained at 60±0.6 volt.

The operation of the voltage regulator may be explained as follows:

The reactance of the ferro-resonant circuit is inductive at low current values through the circuit and, as the current through the ferro-resonant circuit is increased the flux in core 10, 11 increases to saturate the core and thus cause the reactance of windings 13 and 14 to decrease and the impedance of the ferro-resonant circuit to decrease. The circuit thus jumps into ferro-resonance, but since the circuit is unstable at the resonance condition it is operated above the jumping point where the impedance of the circuit is at all times capacitative. In this operating range above the jumping point, when the voltage of the source rises the current through windings 13 and 14 and, therefore, the magnetomotive forces due to these windings, rises relatively slowly, and vice versa. The magnetomotive forces produced by windings 23 and 24 are smaller than those produced by windings 13 and 14 but increase at a more rapid rate in response to an increase in voltage of source 18, and vice versa. As a result, the flux in leg 10 increases and the flux in leg 11 decreases in response to an increase of line voltage 18, and vice versa. Therefore, when the voltage of source 18 increases, for example, the voltage across winding 13 decreases and the voltage across winding 14 increases. However, for a certain change in voltage of the source, the resulting voltage change across winding 14 is greater than the voltage change across winding 13 so that, if the sum of voltages across windings 13 and 14 were impressed upon output circuit 70, 71, the output voltage of the transformer would rise in response to a voltage increase of the source. Therefore, only a portion 15 of winding 14 is included across the output circuit 70, 71 such that the sum of the voltages across 13 and 15 remains substantially constant when the voltage of the source 18 changes.

It should here be noted that the mode of operation of the transformer depends to a large extent upon the ratio of the magnetomotive forces produced by the main and auxiliary windings, respectively, on each of the outer legs of the core structure when the source has a certain voltage and frequency and when the load is fixed at a certain value. Since the magnetomotive forces produced by windings 14 and 24 are aiding the flux through leg 10 of the core and, therefore, the voltage across winding 14 or across a separate secondary winding on this leg, will rise in response to an increase of voltage of source 18 no matter what the ratio of the magnetomotive force produced by the winding 14 to that produced by winding 24. This is not true with respect to windings 13 and 23 because the magnetomotive forces produced by these windings are opposed. When the ratio of the magnetomotive force produced by winding 13 to that produced by winding 23 has a certain value, the increase in magnetomotive force produced by winding 13 due to an increase in line voltage will equal the increase in magnetomotive force produced by winding 23 and, as a result, the voltage across winding 13 or across a separate secondary winding on core 11 will remain substantially constant irrespective of voltage variations of the source. When the ratio is increased with respect to the ratio required to produce constant voltage across winding 13, the voltage across winding 13 will rise in response to an increase in line voltage and, when the ratio is decreased, the voltage across winding 13 will decrease in response to an increase in line voltage, and vice versa.

The arrangement shown in the drawing has the advantage of economy of space and cost in that separate output windings are not used while permitting one side of the load as well as one side of the voltage source to be grounded. Where it is not required that one side of the load be grounded, or where separate output windings are used, the windings may be chosen so that the ratio of the lagging current through windings 23 and 24 to the leading current through windings 13 and 14 is increased, thus improving the power factor and at the same time maintaining the output voltage substantially constant.

The impedance-frequency curve 40 for the impedance Z in series with a load of a certain value is shown in Fig. 2. As indicated, the resonant frequency of the impedance Z is below the range of frequencies of source 18, that is, 56 to 62 cycles. The impedance Z is, therefore, inductive over the operating range of frequencies and, over this range, the impedance increases as the frequency rises, and vice versa. The voltage across the output leads 70, 71 of the transformer rises due to an increase in frequency of source 18 since the current through the ferro-resonant circuit 13, 14, 17 rises in response to an increase in frequency, and vice versa. As the frequency of source 18 increases, for example, to cause an increase of voltage at the output leads 70, 71 of the transformer, the voltage drop across impedance Z increases correspondingly to maintain the voltage across the load 38 constant.

The load voltage is also maintained constant irrespective of load variations over the operating range. When the load increases, for example, the voltage across winding portion 15 decreases and the voltage across winding 13 increases, the voltage increase across winding 13 being somewhat greater than the decrease in voltage across winding portion 15. Therefore the sum of these voltages across the output leads 70, 71 will rise slightly in response to an increase in load when the voltage and frequency of the source 18 remain constant. At the same time the reactance of inductance 31 and, therefore, the impedance Z, decreases as the load increases by such an amount that the voltage across the load remains substantially constant irrespective of load variations over the operating range.

The load voltage may be increased or decreased by changing the ratio of turns of winding portion 15 to that of winding portion 16 or by changing the number of turns of windings 35, 36, or both. The load voltage may also be changed by amounts up to about 20 per cent by moving the disc 39 by means of screw 37 to change the reluctance of the shunt path around gaps 81 and 83 and thus change the reluctance of the magnetic circuit and the inductance of windings 35 and 36.

As indicated above, the ratio of turns of each main winding to the turns of each auxiliary winding could be so chosen that the voltage across the main winding 13 on leg 11 of the core in which opposing magnetomotive forces are produced is substantially constant irrespective of voltage variations of the source. Thus, the output voltage could be taken from a winding on leg 11 alone. However, when taking the output voltage from this winding alone the wave form of the load current is peaked. The wave form of the load current is considerably improved by taking the output voltage from two windings in series, that is, from windings 13 and 14 as shown or from two secondary windings one on leg 10 and the other on leg 11. Moreover, the use of impedance Z in the load circuit further improves the wave form since it is nearly tuned to the fundamental frequency of the source and, therefore, attenuates harmonics of the fundamental frequency so that the load current is substantially of sine wave form.

What is claimed is:

1. A voltage regulating apparatus comprising a three-legged core having a plurality of windings on each of the outer legs thereof, means for supplying current from an alternating current source to a plurality of said windings on each of said legs to cause aiding magnetomotive forces to be produced due to the currents in the windings on one of said legs and to cause opposing magnetomotive forces to be produced due to the currents in the windings on the other of said legs, a circuit having a load connected therein, and means for supplying to said load current having a substantially sine wave form at a voltage which remains substantially constant irrespective of voltage variations of said source, said means comprising a plurality of said windings one on each of said outer legs connected in series with each other across said output circuit and an impedance which is resonant at a frequency below the frequency of said source connected in said circuit in series with said load.

2. A voltage regulating apparatus adapted to be connected to an alternating current source for supplying substantially sine wave alternating current to a load while maintaining the load voltage substantially constant irrespective of voltage and frequency variations of the source and irrespective of load variations comprising a three-legged core of magnetic material, a plurality of windings on the outer legs of said core, a series ferro-resonant circuit having a capacitative impedance during operation connected to said source of alternating current and comprising two of said plurality of windings one on each of said outer legs and a condenser, said windings producing aiding magnetomotive forces for setting up a flux through a magnetic path including said outer legs, a second circuit comprising two of said plurality of windings one on each of said outer legs connected to said alternating current source, the windings on one of said legs producing aiding magnetomotive forces and the windings on the outer leg producing opposing magnetomotive forces when energized by current from said alternating current source, a load circuit comprising two of said plurality of windings one on each of the outer legs of said core, and means comprising a condenser and a saturable core inductance connected in said load circuit in series with each other and with the load, said means being resonant to a frequency slightly below the range of frequencies which said source may have during operation, the permeability of the core of said inductance decreasing slightly in response to an increase in load current, and vice versa.

3. A voltage regulator comprising a three-legged core of magnetic material having a plurality of windings on each of the outer legs thereof, means for supplying current from an alternating current source to four of said windings two on each of the outer legs of said core to cause the windings on one leg to produce aiding magnetomotive forces and to cause the windings on the other leg to produce opposing magnetomotive forces, a load circuit, and means for connecting said load circuit across two of said plurality of windings in series one on each of said outer legs to supply to said load circuit a voltage which remains substantially constant irrespective of voltage variations of the source and to attenuate harmonics of the fundamental frequency of the load current.

4. A voltage regulator comprising a three-legged core of magnetic material having a plurality of windings on each of the outer legs thereof, means for supplying current from an alternating current source to four of said windings two on each of the outer legs of said core to cause the windings on one leg to produce aiding magnetomotive forces and to cause the windings on the other leg to produce opposing magnetomotive forces, a load circuit and means for connecting said load circuit across two of said plurality of windings in series one on each of said outer legs to supply to said load circuit a voltage which remains substantially constant irrespective of voltage variations of the source and to attenuate harmonics of the fundamental frequency of the load current and an impedance which is resonant to a frequency below the frequency of said source connected in said load circuit for further attenuating harmonics of the fundamental frequency of the load current.

5. A voltage regulating apparatus adapted to be connected to a source of alternating current comprising a load circuit having a load connected therein, means for impressing upon said load circuit a voltage which is maintained substantially constant irrespective of voltage variations of said source but which varies in response to load variations, and means in said load circuit for maintaining the load voltage substantially constant irrespective of load variations, said means comprising an inductance having a core the reluctance of which varies in response to load variations.

6. A voltage regulating apparatus adapted to be connected to a source of alternating current comprising a load circuit having a load connected therein, means for impressing upon said load circuit a voltage which is maintained substantially constant irrespective of voltage variations of said source but which varies in response to load variations, and an impedance in said load circuit for maintaining the load voltage substantially constant irrespective of load variations, said impedance comprising a condenser and a saturable core inductance in series and having a resonant frequency which varies in response to load variations over a frequency range below the operating range of frequencies of said source.

7. A voltage regulating apparatus adapted to be connected to a source of alternating current comprising a load circuit having a load connected therein, means for impressing upon said load circuit a voltage which is maintained substantially constant irrespective of voltage variations of said source but which varies in response to load variations, and an impedance in said load circuit for maintaining the load voltage substantially constant irrespective of load variations, said impedance comprising a condenser and a saturable core inductance in series and having a resonant frequency which varies in response to load variations over a frequency range below the operating range of frequencies of said source, and means for manually varying the reluctance of said core for adjusting the load voltage.

BRUCE E. STEVENS.